(12) United States Patent
Rhim (10) Patent No.: US 8,219,083 B2
(45) Date of Patent: Jul. 10, 2012

(54) SERVICE ROAMING SYSTEM AND METHOD

(75) Inventor: Eun-hee Rhim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 677 days.

(21) Appl. No.: 11/782,270

(22) Filed: Jul. 24, 2007

(65) Prior Publication Data

US 2008/0057952 A1 Mar. 6, 2008

Related U.S. Application Data

(60) Provisional application No. 60/840,715, filed on Aug. 29, 2006, provisional application No. 60/861,091, filed on Nov. 27, 2006.

(30) Foreign Application Priority Data

Feb. 13, 2007 (KR) .......................... 10-2007-0014991

(51) Int. Cl.
*H04W 4/00* (2009.01)
(52) U.S. Cl. ................... 455/433; 455/432.1; 455/435.2; 455/552.1; 455/414.1; 455/436
(58) Field of Classification Search .................. 455/433, 455/432.1, 435.2, 552.1, 414.1, 436
See application file for complete search history.

(56) References Cited

U.S. PATENT DOCUMENTS

| | | | |
|---|---|---|---|
| 6,754,907 B1 | 6/2004 | Schumacher et al. | |
| 7,024,256 B2 | 4/2006 | Krzyanowski et al. | |
| 7,596,385 B2 * | 9/2009 | Aghvami et al. | 455/552.1 |
| 2002/0091834 A1 | 7/2002 | Isozu et al. | |
| 2005/0144321 A1 * | 6/2005 | Forsberg | 709/245 |
| 2005/0252959 A1 * | 11/2005 | Gaumond et al. | 235/375 |
| 2006/0256751 A1 * | 11/2006 | Jagadeesan et al. | 370/331 |
| 2007/0234048 A1 * | 10/2007 | Ziv | 713/159 |

FOREIGN PATENT DOCUMENTS

| | | |
|---|---|---|
| EP | 1 075 123 A1 | 2/2001 |
| EP | 1 571 803 A1 | 9/2005 |
| EP | 1 845 684 A1 | 10/2007 |
| JP | 2003-061163 A | 2/2003 |
| JP | 2004-328602 A | 11/2004 |
| KR | 2003-0091595 A | 12/2003 |
| KR | 2006-0093803 A | 8/2006 |

(Continued)

OTHER PUBLICATIONS

Kawarasaki, M. et al. "Metadata driven Seamless Content Handover in Ubiquitous Environment", Proceedings of the 2004 International Symposium on Applications and the Internet, 2004, pp. 287-290, IEEE, XP 010682164.

(Continued)

*Primary Examiner* — Barry W Taylor
(74) *Attorney, Agent, or Firm* — Sughrue Mion, PLLC (57) ABSTRACT

The present invention relates to service roaming. A service roaming system according to an embodiment of the present invention includes a first service operator providing a service, a first service reproduction apparatus running the service and transmitting roaming information input from a user to the first service operator, a second service operator providing the service through roaming on the basis of the roaming information, and a second service reproduction apparatus running the service to be provided through roaming.

17 Claims, 8 Drawing Sheets

FOREIGN PATENT DOCUMENTS

KR    2006-0099147 A    9/2006

OTHER PUBLICATIONS

European Office Action issued Feb. 10, 2011, in Application No. 07793591.4.

Girish Welling, et al.; "Session Mobility Support for Multimedia Applications"; Proceedings of SPIE USA; Col. 3654, Jan. 1, 1998; pp. 52-63; ISSN 0277-786X; XP008037134.

I-D Action:draft-komiya-mmusic-session-monbility-usecases-00.txt; retrieved from Internet: URL:http//www.ietf.org/mail-archive/web/i-d-announce/current/msg09120.html [retrieved on Feb. 2, 2011], 2pgs.

"Use Cases for Session Mobility in Multimedia Applicationsdraft-komiay-mmusic-session-mobility-usecases-00"; Retrieved from Internet: URL: http//datatracker.ietf.org/doc/draft-komiya-mmusic-session-mobility-usecases/history/ [retrieved on Feb. 2, 2011], 1pg.

* cited by examiner

SERVICE ROAMING SYSTEM AND METHOD

CROSS REFERENCE TO RELATED APPLICATION

This application claims priority from Korean Patent Application No. 10-2007-0014991 filed on Feb. 13, 2007 in the Korean Intellectual Property Office, and U.S. Provisional Patent Application Nos. 60/840,715 and 60/861,091, filed on Aug. 29, 2006 and Nov. 27, 2006, respectively, in the United States Patent and Trademark Office, the disclosures of which are incorporated herein by reference in their entireties.

BACKGROUND OF THE INVENTION

1. Field of the Invention

Systems and methods consistent with the present invention relate to service roaming, and in particular, to a service roaming system and method that provides a service roaming function to enable service transfer between different apparatuses.

2. Description of the Related Art

With the advancement of communication technology, various contents, such as broadcast, application programs, and the like, are being provided to broadcast receiving apparatuses and mobile devices through a wired or wireless network.

For example, while watching a broadcast on a digital television (TV) at home, a user can pop up an electronic program guide (EPG) screen in order to obtain program information of other channels and can run a relevant application program in order to obtain current weather, traffic, and securities information. In addition, in a television commerce, i.e., T-commerce, environment in which the user can purchase goods, make payments, and shop using a remote control device, the user can purchase desired goods by executing an authentication or billing application program while watching the broadcast.

The broadcast that the user is watching, the EPG screen, the weather information, the traffic information, the securities information, and the authentication or billing application program are "services" that are provided to the user through the digital TV.

These services can run on various apparatuses. An apparatus on which a service is running is connected to a service provider through a network, and perform communication with the service provider according to a prescribed protocol.

Meanwhile, a user may want to transfer a service, which is running on a specified apparatus, to another apparatus. For example, the user wants to transfer a service, which is running on a TV at home, to a mobile apparatus and then bring out the mobile apparatus. In this case, since a service roaming function is not provided, the user should end the service, which is running on the TV and access a service provider using the mobile apparatus to request a desired service. Then, the user should download the desired service and run the downloaded service.

While watching a broadcast on the TV, the user may pop up the EPG screen. However, a service to provide the EPG screen cannot be separately run on another apparatus. Accordingly, it is inconvenient for the user to run the service to provide the EPG screen because a current broadcast screen is obstructed.

In order to solve the above problems, there is a need for a method that transfers a service to be provided by a service provider between apparatuses.

SUMMARY OF THE INVENTION

An aspect of the present invention is to provide a service roaming system and method that enables transfer of a service to be provided by a service provider between apparatuses.

Aspects of the present invention are not limited to those mentioned above, and other aspects of the present invention will be apparently understood by those skilled in the art through the following description.

According to an embodiment of the present invention provides a service roaming system, the service roaming system including a first service operator providing a service, a first service reproduction apparatus running the service and transmitting roaming information input from a user to the first service operator, a second service operator roaming and providing the service on the basis of the roaming information, and a second service reproduction apparatus running the service to be provided through roaming.

Another embodiment of the present invention provides a service roaming system, the service roaming system including a service operator providing a service, a first service reproduction apparatus running the service and transmitting roaming information input from a user to the service operator, and a second service reproduction apparatus running the service to be provided by the service operator through roaming on the basis of the roaming information.

Still another embodiment of the present invention provides a service roaming method, the service roaming method including running a service to be provided from a first service operator, transmitting roaming information input from a user to the first service operator, causing a second service operator to receive the roaming information from the first service operator and to provide the service through roaming on the basis of the received roaming information, and running the service to be provided.

Yet still another embodiment of the present invention provides a service roaming method, the service roaming method including running a service to be provided from a service operator, transmitting roaming information input from a user to the service operator, providing the service through roaming on the basis of the transmitted roaming information, and running the service to be provided through roaming.

BRIEF DESCRIPTION OF THE DRAWINGS

The above and other features of the present invention will become more apparent by describing in detail exemplary embodiments thereof with reference to the attached drawings in which.

DESCRIPTION OF THE EXEMPLARY EMBODIMENTS

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art.

The present invention will be described hereinafter with reference to block diagrams or flowchart illustrations of a service roaming system and method according to an exemplary embodiment thereof. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

In addition, each block of the flowchart illustrations may represent a module, segment, or portion of code, which comprises one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in the reverse order, depending upon the functionality involved.

The term "service roaming" used herein means that a service to be provided through a wired or wireless network, that is transferred between apparatuses (hereinafter, referred to as "service reproduction apparatuses") that can run the service. At this time, the service roaming is a concept including a case where a part of a service is transferred to another apparatus, as well as a case where the entire service is transferred to another apparatus. For example, when one service includes a motion picture broadcast service and a data broadcast service, a case where only the data broadcast service is separated and runs on another apparatus falls within the "service roaming".

The term "roaming information" includes information about a service to be provided from a service reproduction apparatus to another service reproduction apparatus through roaming and information about a service reproduction apparatus on which the service to be provided through roaming is reproduced.

The term "service operator" used herein may be a service provider that provides a service to a service reproduction apparatus or a network administrator that administrates a network to which the service is provided. Further, the service operator can carry out both service provision and network administration.

Figure 1:
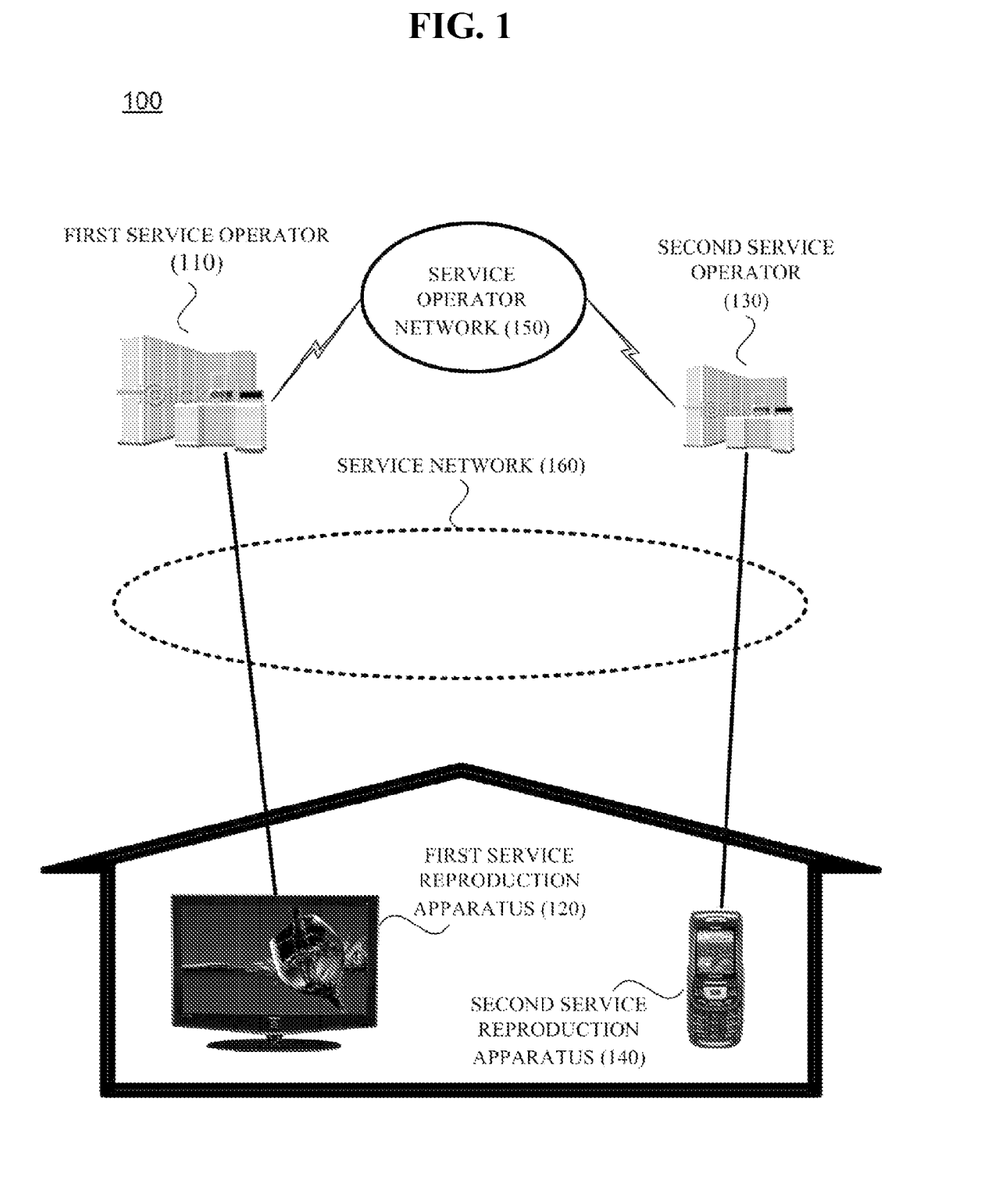
FIG. 1 is a diagram showing a service roaming system according to an embodiment of the present invention.

FIG. 1 is a diagram showing a service roaming system according to an embodiment of the present invention.

Referring to FIG. 1, a service roaming system 100 includes service operators 110 and 130, first and second service reproduction apparatuses 120 and 140, a service operator network 150, and a service network 160.

Here, the service operator network 150 is a network through which the service operators perform communication, and the service network 160 is a network through which the service operators and the service reproduction apparatuses perform communication.

The first service reproduction apparatus 120 can be registered in the first service operator 110 and run a service to be provided by the first service operator 110. Further, the second service reproduction apparatus 140 can be registered in the second service operator 130 and run a service to be provided by the second service operator 130.

The first service operator 110 and the second service operator 130 can share registration information about the service reproduction apparatuses registered in the individual service operators through the service operator network 150. At this time, the registration information includes identification information about the service reproduction apparatus, connection information, or information about the service to be provided to the service reproduction apparatus. The registration information can also include information of a user who uses the service reproduction apparatus.

Hereinafter, a service roaming method that enables a service, which is running on one service reproduction apparatus, to run on another service reproduction apparatus through the system shown in FIG. 1 will be described in detail with reference to FIGS. 2 to 4.

Figure 2:
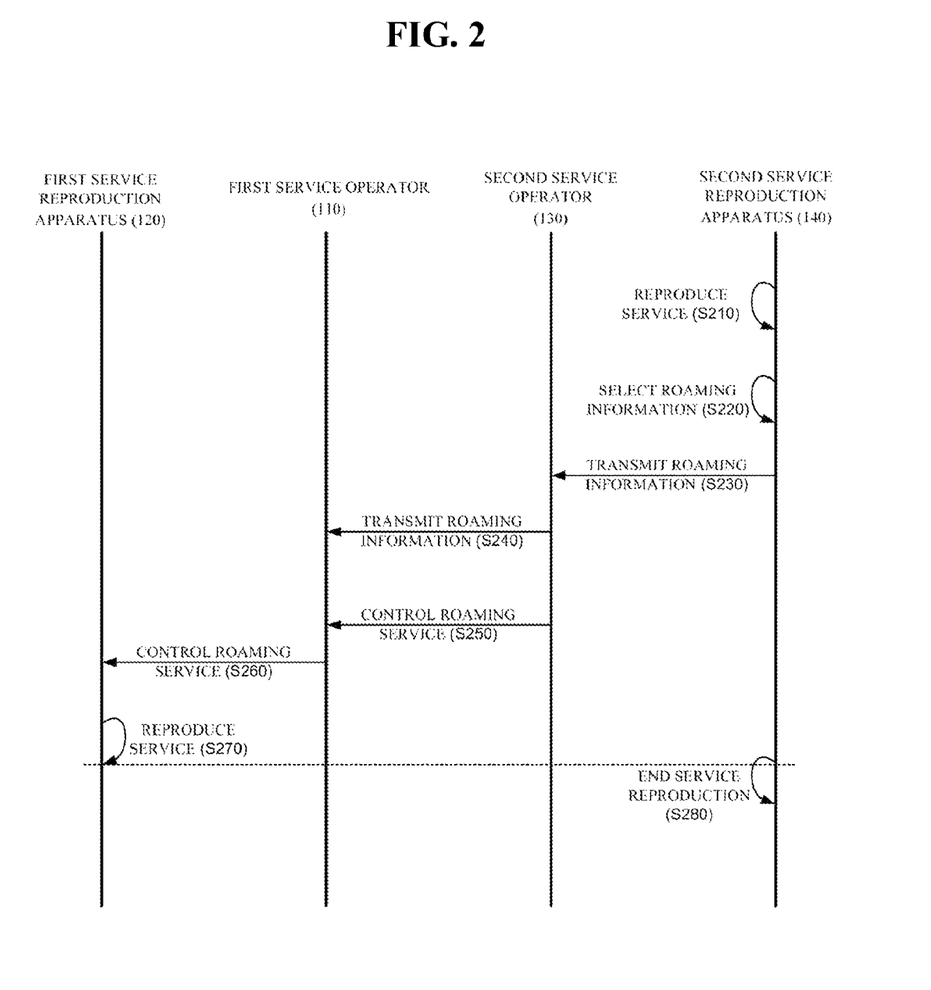
FIG. 2 is a diagram showing a service roaming method in the service roaming system shown in FIG. 1.

FIG. 2 is a diagram showing a service roaming method in the service roaming system shown in FIG. 1.

First, a user is reproducing a service to be provided from the second service operator 130 outside the home, using the second service reproduction apparatus 140 (S210).

When the user arrives at home while the service is being reproduced and wants to continuously run the service, which is running on the second service reproduction apparatus 140, on the first service reproduction apparatus 120 at home, he/she selects the service, which is running on the second service reproduction apparatus 140, and the first service reproduction apparatus 120. That is, the user selects roaming information for service roaming to the first service reproduction apparatus 120 (S220), and the selected roaming information is transmitted to the second service operator 130 through the service network 160 (S230). At this time, the service to be provided through roaming may include a service that is currently running on the second service reproduction apparatus 140 and any service that is provided by the second service operator 130. In order to provide the roaming information, the second service reproduction apparatus 140 may provide a user interface that allows the user to select the roaming information.

The second service operator 130 retransmits the transmitted roaming information to the first service operator 110 through the service operator network 150 (S240).

Next, the second service operator 130 performs a control for a roaming service through the first service operator 110 on the basis of the roaming information (S250 and S260).

The first service reproduction apparatus 120 continuously reproduces the service to be provided through roaming according to the control (S270), and the service, which is being reproduced on the second service reproduction apparatus 140, ends (S280).

Meanwhile, when the service is reproduced on the first service reproduction apparatus 120 or ends on the second service reproduction apparatus 140, an authentication procedure about the user can be performed without needing an additional input of the user.

Further, while performing the service roaming, the first service operator 110 can adjust scalability or resolution of the contents constituting the service so as to be compatible with the first service reproduction apparatus 120, thereby maintaining the quality of the service.

Figure 3:
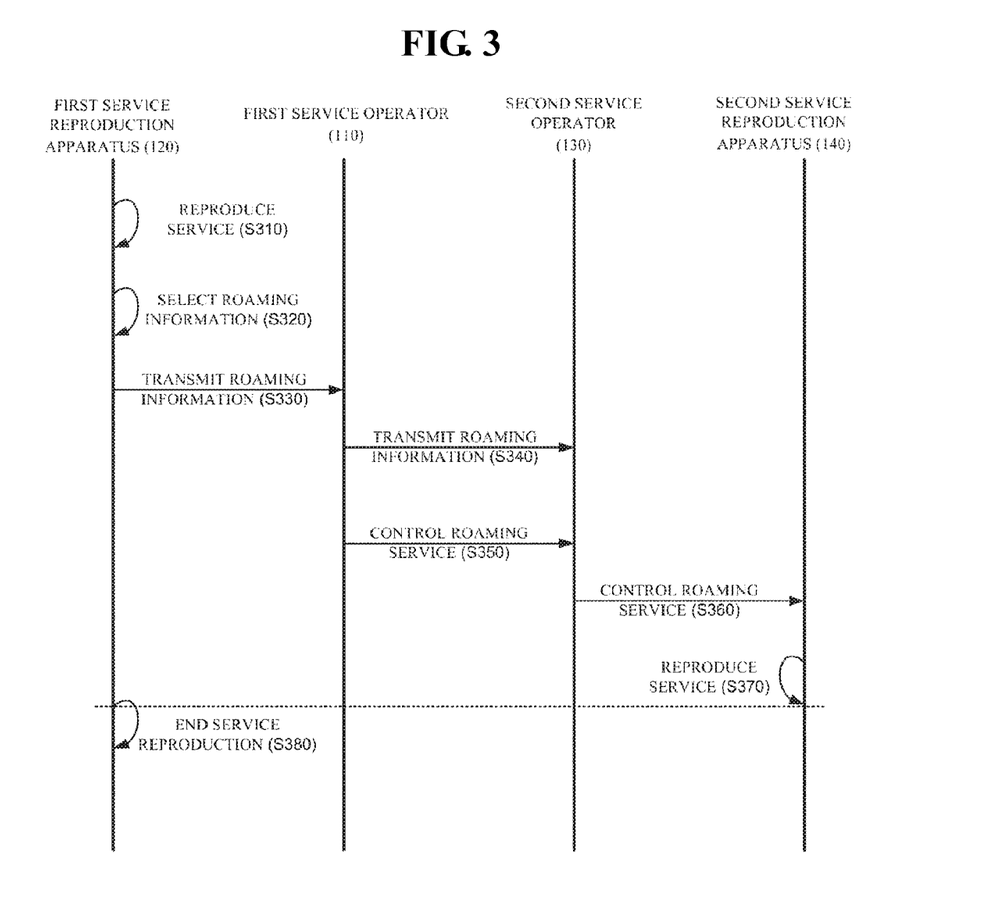
FIG. 3 is a diagram showing another service roaming method in the service roaming system shown in FIG. 1.

FIG. 3 is a diagram showing another service roaming method in the service roaming system shown in FIG. 1.

First, the user is reproducing the service to be provided from the first service operator 110 at home using the first service reproduction apparatus 120 (S310).

When the user brings the second service reproduction apparatus 140 out of the home, while the service is being reproduced and wants to continuously run the service, which is being reproduced on the first service reproduction apparatus 120 at home, on the second service reproduction apparatus 140, he/she selects the service, which is running on the first service reproduction apparatus 120, and the second service reproduction apparatus 140. That is, the user selects roaming information for service roaming to the second service reproduction apparatus 140 (S320), and the selected roaming information is transmitted to the first service operator 110 through the service network 160 (S330). At this time, the service to be provided through roaming may include the service, which is currently running on the first service reproduction apparatus 120, and any service that is provided by the first service operator 110. In order to provide the roaming information, the first service reproduction apparatus 120 may provide a user interface that allows the user to select the roaming information.

The first service operator 110 retransmits the transmitted roaming information to the second service operator 130 through the service operator network 150 (S340).

Next, the first service operator 110 performs a control for a roaming service through the second service operator 130 on the basis of the roaming information (S350 and S360).

The second service reproduction apparatus 130 continuously reproduces the service to be provided through roaming according to the control (S370), and the service, which is being reproduced on the first service reproduction apparatus 120, ends (S380).

Meanwhile, when the service ends on the first service reproduction apparatus 120 or is reproduced on the second service reproduction apparatus 140, an authentication procedure about the user can be performed without needing an additional input of the user.

Further, while performing the service roaming, the second service operator 130 can adjust scalability or resolution of the contents constituting the service so as to be compatible with the second service reproduction apparatus 140, thereby maintaining the quality of the service.

Figure 4:
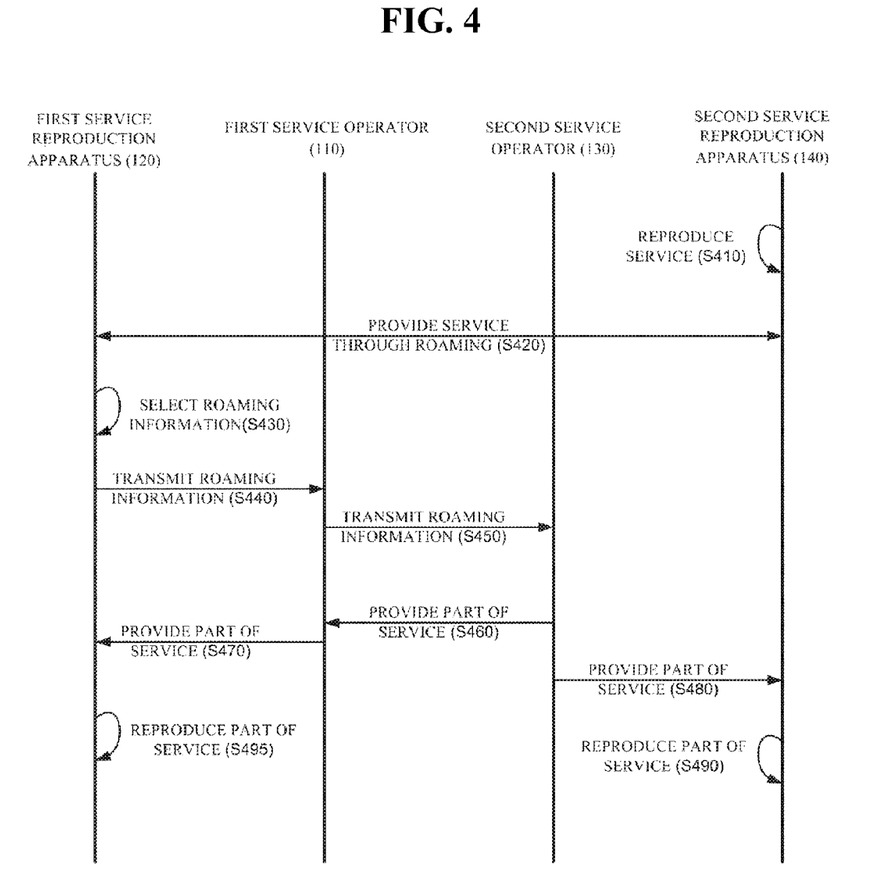
FIG. 4 is a diagram showing still another service roaming method in the service roaming system shown in FIG. 1.

FIG. 4 is a diagram showing still another service roaming method in the service roaming system shown in FIG. 1.

First, a user A and a user B are reproducing the service to be provided from the second service operator 130 using the second service reproduction apparatus 140 (S410). For example, it is assumed that the user A and the user B are watching a soccer game.

If the user A and the user B arrive at home while the service is being reproduced, they perform service roaming according to the method shown in FIG. 2 using the first service reproduction apparatus 120 at home (S420). Then, the soccer game that is provided by the second service operator 130 passes through the first service operator 110 and runs on the first service reproduction apparatus 120 by the service roaming, such that the user A and the user B can continuously watch the soccer game through the first service reproduction apparatus 120.

Next, when the user A wants to see data information, such as team information, player information, or the like, from the service about the soccer game, which is running on the first service reproduction apparatus 120, through the second service reproduction apparatus 140, he/she selects a service to provide the data information in the first service reproduction apparatus 120 from the running service and the second service reproduction apparatus 140. That is, the user A selects roaming information so as to provide a part of the service to the second service reproduction apparatus 140 (S430), and the selected roaming information is transmitted to the first service operator 110 through the service network 160 (S440). In order to provide the roaming information, the first service reproduction apparatus 120 may provide a user interface that allows the user to select the roaming information.

The first service operator 110 retransmits the transmitted roaming information to the second service operator 130 through the service operator network 150 (S450).

Next, the second service operator 130 provides a part of the service, excluding the service to the data information, from the service, which is being reproduced on the first service reproduction apparatus 120, to the first service operator 110 on the basis of the roaming information (S460). The first service operator 130 provides the part of the service to be provided to the first service reproduction apparatus 120 (S470).

Further, the second service operator 130 provides only the service to provide the data information to the second service reproduction apparatus 140 (S480).

Next, the first service reproduction apparatus 120 and the second service reproduction apparatus 140 reproduce the parts of the service to be provided by the second service operator 130 (S490 and S495).

Meanwhile, when the service is reproduced on the first service reproduction apparatus 120 and the second service reproduction apparatus 140, an authentication procedure about the user can be performed without needing an additional input of the user.

Further, while the second service operator 130 performs roaming of the part of the service to the first service reproduction apparatus 120 through the first service operator 110, the first service operator 110 can adjust scalability or resolution of the contents constituting the service to be compatible with the first service reproduction apparatus 120, thereby maintaining the quality of the service.

Meanwhile, in FIG. 4, from the service that is being reproduced on the second service reproduction apparatus 140, a part of the service, for example, a motion picture of the soccer game may be provided to the first service reproduction apparatus 120 through roaming. To this end, the user may select roaming information so as to provide a part of the service to the first service reproduction apparatus 120, and the selected roaming information may be transmitted to the second service operator 110 through the service network 160. In order to provide the roaming information, the second service reproduction apparatus 140 may provide a user interface that allows the user to select the roaming information.

Figure 5:
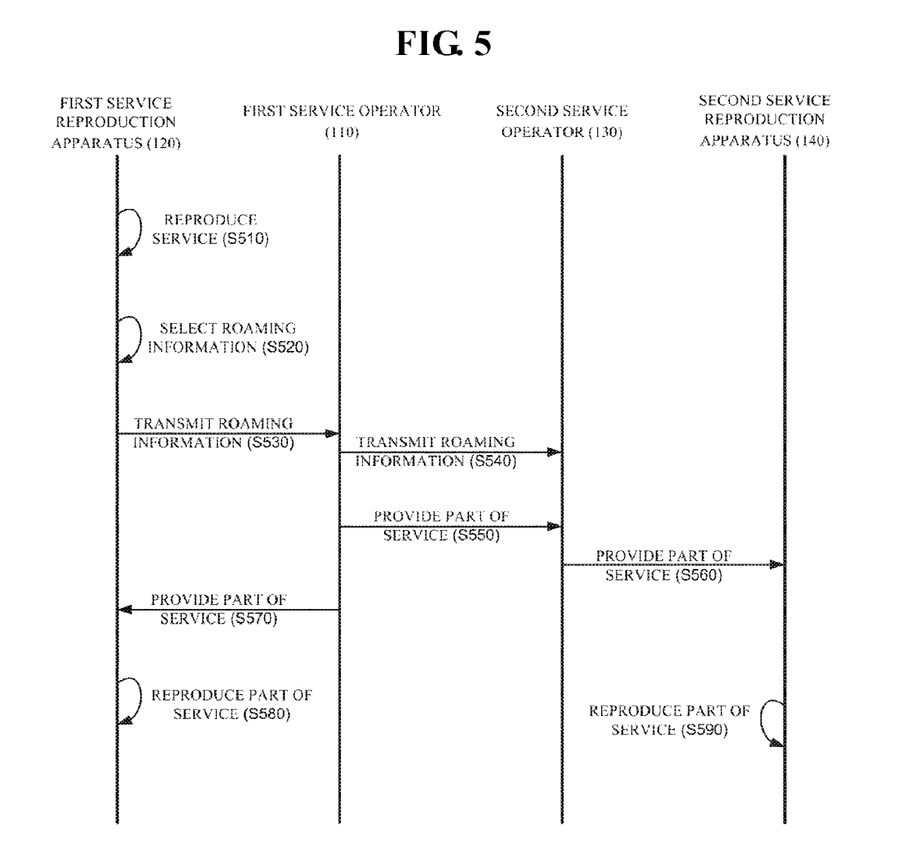
FIG. 5 is a diagram showing yet still another service roaming method in the service roaming system shown in FIG. 1.

FIG. 5 is a diagram showing yet still another service roaming method in the service roaming system shown in FIG. 1.

First, the user is reproducing the service to be provided from the first service operator 110 using the first service reproduction apparatus 120 at home (S510). For example, it is assumed that the user is watching a news program.

When the user wants to see an EPG screen through a screen of the second service reproduction apparatus 140 in order to obtain information about broadcast programs of other channels while the service is being reproduced, he/she selects a service to provide EPG information from the service, which is running on the first service reproduction apparatus 120, and the second service reproduction apparatus 140. That is, the user selects roaming information so as to provide a part of the service to the second service reproduction apparatus 140 (S520), and the selected roaming information is transmitted to the first service operator 110 through the service network 160 (S530). In order to provide the roaming information, the first service reproduction apparatus 120 may provide a user interface that allows the user to select the roaming information.

The first service operator 110 transmits the roaming information to the second service operator 130 through the service operator network 150 (S540), and provides the part of the service to provide the EPG screen (S550).

Next, the second service operator 130 provides the part of the service to the second service reproduction apparatus 140 again on the basis of the roaming information (S560). The first service operator 110 provides a part of the service, excluding the service to provide the EPG screen, from the service that is being reproduced on the first service reproduction apparatus 120 (S570).

Next, the first service reproduction apparatus 120 and the second service reproduction apparatus 140 reproduce the parts of the service to be provided by the first service operator 110 (S570 and S580).

Meanwhile, when the service is reproduced on the first service reproduction apparatus 120 and the second service reproduction apparatus 140, an authentication procedure about the user can be performed without needing an additional input of the user.

Further, while performing roaming of the part of the service to the second service reproduction apparatus 140 from the first service operator 110, the second service operator 130 can adjust scalability or resolution of the contents constituting the service to be compatible with the second service reproduction apparatus 140, thereby maintaining the quality of the service.

Figure 6:
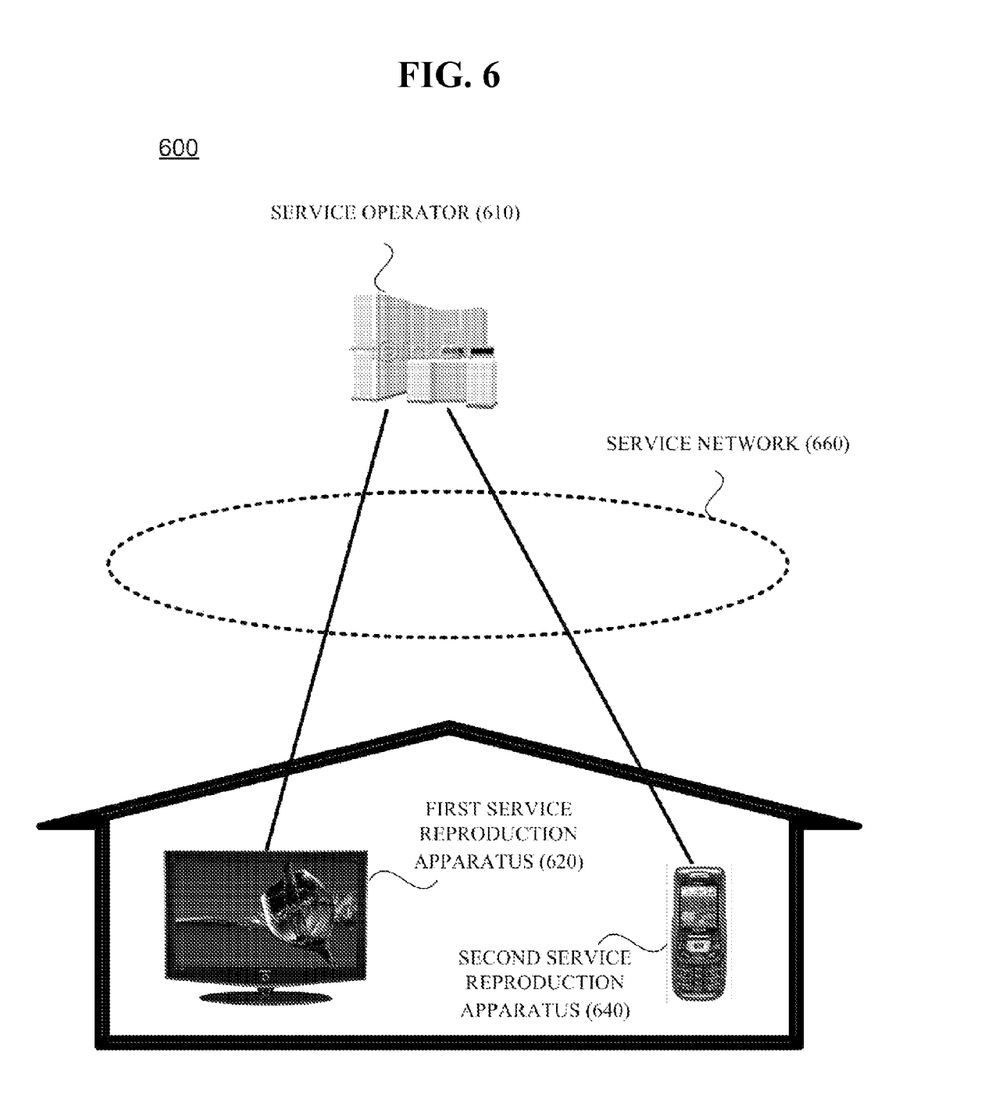
FIG. 6 is a diagram showing a service roaming system according to another embodiment of the present invention.

FIG. 6 is a diagram showing a service roaming system according to another embodiment of the present invention.

Referring to FIG. 6, the service roaming system 600 includes a service operator 610, first and second service reproduction apparatuses 620 and 640, and a service network 660 through which the service operator and the service reproduction apparatuses perform communication. Here, the service network 660 is a network through the service operator and the service reproduction apparatuses perform communication.

The first service reproduction apparatus 620 and the second service reproduction apparatus 640 can run a service to be provided by the service operator 610. The individual service reproduction apparatuses 620 and 640 can be registered in the service operator 610 and run the service to be provided by the service operator 610.

The service operator 610 stores registration information of the individual service reproduction apparatuses. The registration information includes identification information about the service reproduction apparatus, connection information, or information about the service to be provided to the service reproduction apparatus. The registration information can also include information of the user who uses the service reproduction apparatus.

Hereinafter, a service roaming method that enables a service, which is running on one service reproduction apparatus, to run on another service reproduction apparatus through the system shown in FIG. 6 will be described in detail with reference to FIGS. 7 and 8.

Figure 7:
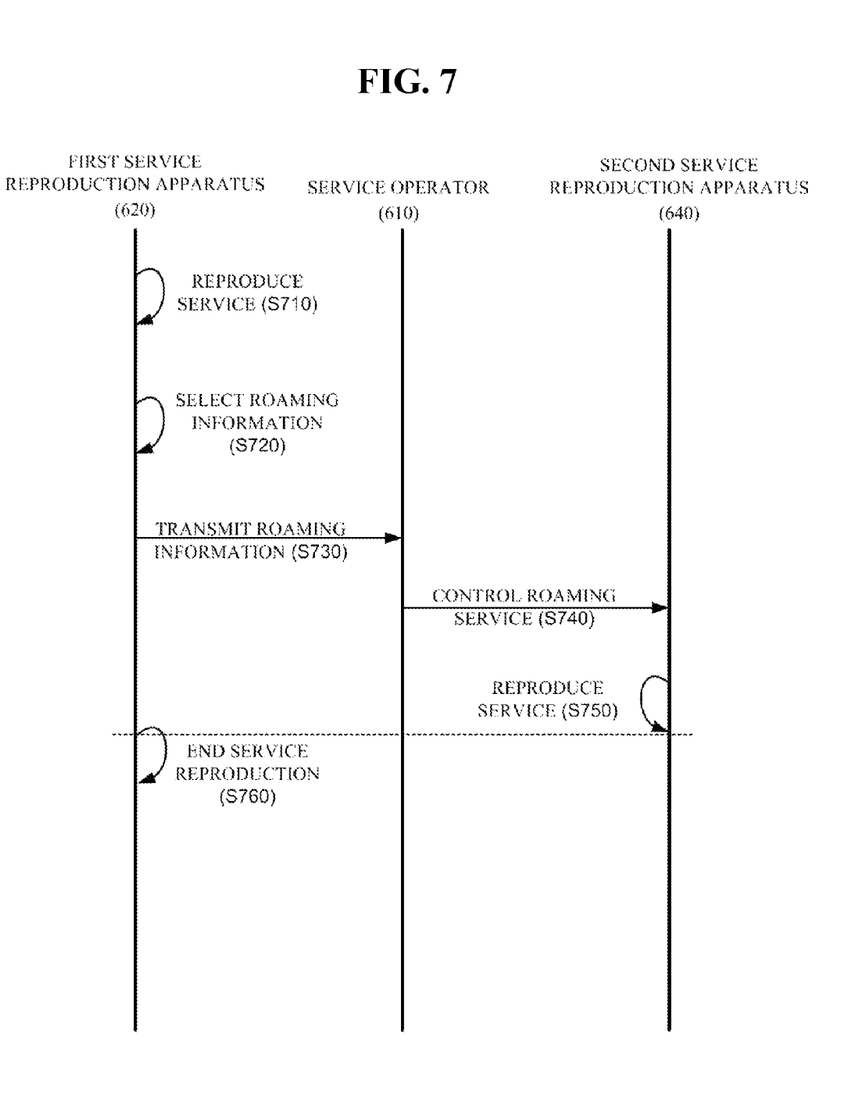
FIG. 7 is a diagram showing a service roaming method in the service roaming system shown in FIG. 6.

FIG. 7 is a diagram showing a service roaming method in the service roaming system shown in FIG. 6.

First, it is assumed that a user A and a user B live together, the user A is preparing an evening party, and the user B is watching an educational broadcast to be provided from the service operator 610 through the first service reproduction apparatus 620 (S710).

If the friends of the user A arrive in the evening, the user B selects roaming information for service roaming in order to transfer the educational broadcast service, which is currently running, to the second service reproduction apparatus 640 and to watch the educational broadcast in another room (S720). Here, the roaming information includes the educational broadcast service to be provided through roaming and information about the second service reproduction apparatus 640.

In order to provide the roaming information, the first service reproduction apparatus 620 may provide a user interface that allows the user to select the roaming information.

The roaming information selected by the user B is transmitted to the service operator 610 (S730), and the service operator 610 performs a control for a roaming service on the basis of the roaming information (S740).

The second service reproduction apparatus 640 continuously reproduces the service to be provided through roaming according to the control (S750), and the service, which is being reproduced on the first service reproduction apparatus 620, ends (S760).

Meanwhile, when the service ends on the first service reproduction apparatus 620 or is reproduced on the second service reproduction apparatus 640, an authentication procedure of the user can be performed without needing an additional input of the user.

Further, while performing the service roaming, the service operator 610 can adjust scalability or resolution of the contents constituting the service to be compatible with the second service reproduction apparatus 640, thereby maintaining the quality of the service.

Figure 8:
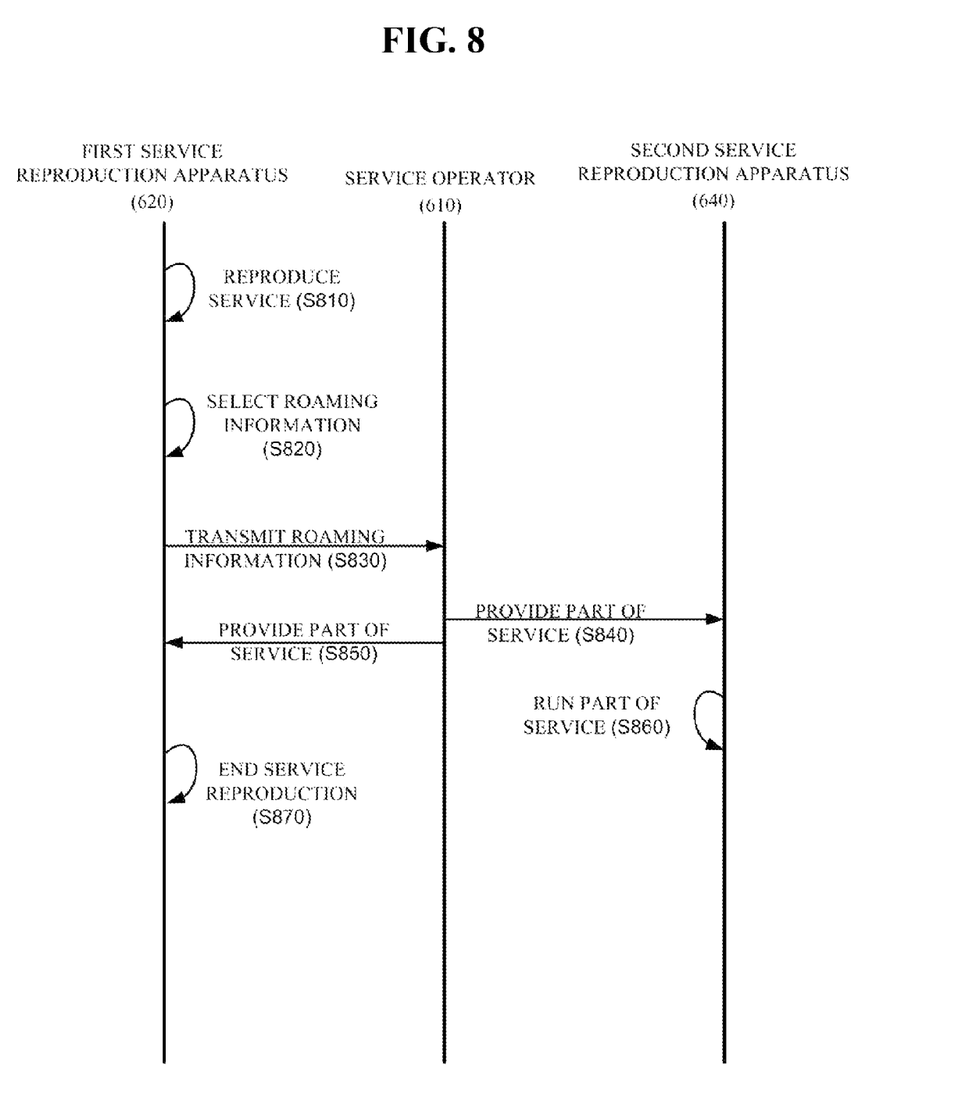
FIG. 8 is a diagram showing another service roaming method in the service roaming system shown in FIG. 6.

FIG. 8 is a diagram showing another service roaming method in the service roaming system shown in FIG. 6.

The user is watching a broadcast service to be provided by the service operator 610 through the first service reproduction apparatus 620 (S810). It is assumed that the broadcast service also provides an Internet phone service based on an Internet protocol.

If, while the user is watching a broadcast, a message indicating that he/she is receiving a call is displayed through the screen of the first service reproduction apparatus 620, the user selects roaming information for roaming of the part of the service in order to transfer a call service to the second service reproduction apparatus (for example, a cellular phone) (S820). Here, the roaming information includes the call service, which is a part of the service to be provided through roaming, and information about the second service reproduction apparatus 640.

In order to provide the roaming information, the first service reproduction apparatus 620 may be a user interface that allows the user to select the roaming information.

The roaming information selected by the user is transmitted to the service operator 610 (S830), and the service operator 610 provides the part of the service regarding the received call service to the second service reproduction apparatus 640 through roaming on the basis of the roaming information (S840), and provides a part of the service, excluding the call service, to the first service reproduction apparatus 620 (S850).

The first service reproduction apparatus 620 and the second service reproduction apparatus 640 reproduce the parts of the service to be provided from the service operator 610 (S860 and S870)

Meanwhile, when the service ends on the first service reproduction apparatus 620 or is reproduced on the second service reproduction apparatus 640, an authentication procedure about the user can be performed without needing an additional input of the user.

According to the present invention, the service network that connects the service operator and the service reproduction apparatus may include an up-link and a down-link, such that two-way communication can be performed between the service operator and the service reproduction apparatus. Further, a return channel may be provided in the service network, such that a control command can be transmitted from the service reproduction apparatus to the service operator. As an example of such a network, a network based on an Internet protocol may be considered.

Further, when service roaming or roaming of the part of the service is made between the service operators, a service operator that receives a request for service roaming may test whether the requested service or the part of the service can be provided through roaming, and may inform the service operator, which requests the roaming, of the test result.

While the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in descriptive sense only and not for purposes of limitation.

As described above, according to the embodiments of the present invention, the user can simply transfer the service to be provided from the service operator to a desired apparatus, thereby improving usability and convenience for the user with respect to the service.

What is claimed is:

1. A service roaming system comprising:
    a first service operator which provides a first service, the first service comprising a first part and a second part;
    a first service reproduction apparatus which runs the first service and transmits first roaming information to the first service operator;
    a second service operator which receives the first roaming information transmitted from the first service operator and provides the first service to a second service reproduction apparatus based on the first roaming information; and
    the second service reproduction apparatus which runs the first service;
    wherein the second service reproduction apparatus transmits second roaming information to the second service operator while the second service reproduction apparatus continues to run the first part;
    wherein the first service operator receives the second roaming information transmitted from the second service operator and provides the second part to the first service reproduction apparatus based on the second roaming information;
    wherein the first service reproduction apparatus runs the second part while the second reproduction apparatus runs the first part.

2. The service roaming system of claim 1, wherein the first service operator and the second service operator are connected to the first service reproduction apparatus and the second service reproduction apparatus, respectively, through a network based on an Internet protocol.

3. The service roaming system of claim 1, wherein the first roaming information includes the first service and information about the second service reproduction apparatus.

4. The service roaming system of claim 1, wherein the first part is one of broadcast content and data information relating to the broadcast content and the second part is another of broadcast content and data information relating to the broadcast content.

5. The service roaming system of claim 1, wherein the first service reproduction apparatus runs the second part simultaneously while the second reproduction apparatus runs the first part.

6. A service roaming system comprising:
    a service operator which provides a first service, the first service comprising a first part and a second part;
    a first service reproduction apparatus which runs the first service and transmits first roaming information to the service operator; and
    a second service reproduction apparatus which runs the first service provided by the service operator based on the first roaming information;
    wherein the second service reproduction apparatus transmits second roaming information to the service operator while the second service reproduction apparatus continues to run the first part;
    wherein the first service reproduction apparatus runs the second part, provided by the service operator based on the second roaming information, simultaneously while the second reproduction apparatus runs the first part.

7. The service roaming system of claim 6, wherein the service operator is connected to the first service reproduction apparatus and the second service reproduction apparatus through a network based on an Internet protocol.

8. The service roaming system of claim 6, wherein the first roaming information includes the second service and information about the second service reproduction.

9. The service roaming system of claim 6, wherein the first part is one of broadcast content and data information relating to the broadcast content and the second part is another of broadcast content and data information relating to the broadcast content.

10. A service roaming method comprising:
    running a first service provided from a first service operator on a first reproduction apparatus, the first service comprising a first part and a second part;
    transmitting, by the first reproduction apparatus, first roaming information to the first service operator;
    receiving, by a second service operator, the first roaming information from the first service operator and providing, by the second service operator, the first service to a second reproduction apparatus based on the received first roaming information;
    running the first service on a second reproduction apparatus;

transmitting, by the second reproduction apparatus, second roaming information to the second service operator while running the first part on the second reproduction apparatus;

receiving, by the first service operator, the second roaming information from the second service operator and providing, by the first service operator, the second part based on the received second roaming information;

running the second part on the first reproduction apparatus while continuing to run the first part on the second reproduction apparatus.

11. The service roaming method of claim 10, wherein the first service operator and the second service operator provide the first service through a network based on an Internet protocol.

12. The service roaming method of claim 10, wherein the first roaming information includes the first service and information about the second service reproduction apparatus.

13. The service roaming method of claim 10, wherein the first part is one of broadcast content and data information relating to the broadcast content and the second part is another of broadcast content and data information relating to the broadcast content.

14. A service roaming method comprising:

running a first service provided by a service operator on a first reproduction apparatus, the first service comprising a first part and a second part;

transmitting first roaming information to the service operator;

providing the first service to a second reproduction apparatus based on the transmitted roaming information; and running the first service on the second reproduction apparatus;

transmitting second roaming information to the service operator while the second reproduction apparatus continues to run the first part;

providing the second part to the first reproduction apparatus based on the transmitted second roaming information; and running the second part on the first reproduction apparatus simultaneously while continuing to run the first part on the second reproduction apparatus.

15. The service roaming method of claim 14, wherein the service operator provides the first service through a network based on an Internet protocol.

16. The service roaming method of claim 14, wherein the first roaming information includes the first service and information about the second service reproduction apparatus.

17. The service roaming method of claim 14, wherein the first part is one of broadcast content and data information relating to the broadcast content and the second part is another of broadcast content and data information relating to the broadcast content.

* * * * *